Oct. 25, 1955 J. W. VAN RIPER 2,721,729
TEMPERATURE CONTROL MECHANISM FOR EXTRUSION APPARATUS
Filed March 16, 1953 5 Sheets-Sheet 1

INVENTOR
JURIAN W. VAN RIPER
BY *Alfred W. Nibber*
ATTORNEY

Oct. 25, 1955  J. W. VAN RIPER  2,721,729
TEMPERATURE CONTROL MECHANISM FOR EXTRUSION APPARATUS
Filed March 16, 1953  5 Sheets-Sheet 3

United States Patent Office 2,721,729
Patented Oct. 25, 1955

2,721,729

TEMPERATURE CONTROL MECHANISM FOR EXTRUSION APPARATUS

Jurian W. Van Riper, Ridgewood, N. J.

Application March 16, 1953, Serial No. 342,543

16 Claims. (Cl. 257—10)

This invention relates to apparatus for selectively heating and cooling a body, whereby such body may be brought quickly to, and maintained at, a desired temperature. More particularly, the invention relates, in preferred embodiments thereof, to apparatus for selectively heating and cooling a part, such as a barrel or a delivery head, of a plastic material extruding machine through which the plastic material is conveyed, whereby such material may be brought quickly to desired temperatures and may be maintained thereat during its travel through the extruding machine part.

As above indicated, the invention in preferred embodiments thereof relates to the heating and cooling of a part of a plastic material extruding machine. The invention finds perhaps its greatest advantages in a barrel, and in other plastic material conducting parts associated therewith such as the head on the barrel, for a screw type extruding machine, the barrel being of appreciable length and the plastic material travelling through it and the head whereby such material is brought to and maintained at desired temperatures.

In the past, such plastic material extruding machine barrels have been temperature controlled by the provision of one or more liquid receiving chambers in the barrel surrounding the screw containing passage therethrough. A temperature controlling liquid, such as oil, was circulated through such chamber or chambers, such liquid being brought to the desired temperature in a portion of its travel outside the barrel, as by selectively operated heating and cooling means. It will be appreciated that such prior temperature controlling apparatus was bulky and expensive to make and operate, and that it was prone to various types of failures including leakage of the heat transferring liquid at the various joints in the system. The loss of heat in the piping required, and the inherent limitation of the highest temperature attainable by the heating means because of characteristics of the heat transfer medium have also made such apparatus not altogether satisfactory.

Plastic material extruding machine barrels have also been temperature controlled by provision of electric heating bands and very limited water cooling passages. Uneven heating has resulted from expansion of the bands, and thus change in the rate of heat transfer from the heaters to the barrel, and from inadequate and uneven cooling from limited cooling passages. Here the passages are interposed between the heating bands and the main body of the barrel, resulting in inefficient heating of the barrel.

It has also been proposed to employ as an extrusion barrel heating and cooling means a heavy walled metal sheath disposed around the barrel, the sheath having electrical heating elements of the tubular resistance type embedded therein, there being fins on the outer surface of the sheath alternatively selectively to cool the barrel. Such extrusion barrel heating and cooling means has not been altogether satisfactory for a variety of reasons. The sheath, being readily removable from the barrel, inherently has poor contact with the barrel with accompanying poor heat transference, aggravated by expansion of the sheath as it is heated. The body of the sheath is cast about the formed heating elements. The sheath must therefore be made of a lower melting point metal than the outer covering of the heating elements, so much so that the heating elements in use cannot be heated to their optimum, effective, radiating temperature. Further, heating of the barrel by radiation from the heating elements is relatively ineffective because of the insulating effect of the sheath, a part of which is interposed between the heating elements and the barrel, and also because of the increased area, presented by the sheath, from which heat losses occur. Cooling of the barrel is also inefficient, because the heating means is interposed between the cooling surfaces and the barrel. With the latter type of barrel heater a short circuit in the heating elements results in the melting of the body of the sheath and its consequent destruction. If the heating element merely burns out without short circuiting the entire sheath must likewise be discarded.

Each of the above types of prior temperature controlling means has utilized separate surfaces built into the barrel for heating and cooling the barrel or other part whose temperature is to be controlled, either the heating or the cooling means being disposed closer to the bore through the barrel, the other of such means being disposed radially outwardly of such first temperature controlling means.

A further type of temperature controlling means has disposed the heating means at generally the same radial distance from the axis of the bore through the barrel as the cooling surface thereon, the heating means being spaced so as to provide spaced cooling surfaces between them. The heating surfaces are thus necessarily fairly widely spaced from each other over the extent of the barrel. The same is true of the cooling surfaces. As a result both the heating and cooling of the barrel produced by this type of temperature control mechanism neither give adequate coverage of the surface area of the barrel nor produce satisfactorily even temperatures throughout the barrel. In all prior temperature control mechanisms of the type with which the present invention is concerned, therefore, the presence of either the heating or cooling means is detrimental to the action of the other of such means.

The present invention has among its objects a provision of an economical, easily controlled, apparatus for selectively heating and cooling a body such as the aforesaid part or barrel of a plastic extruding machine.

More particularly, in a preferred embodiment thereof, the invention provides an electrical heating means which is economical in first cost and also in maintenance, and which is easily controlled to provide a substantially uniform temperature in all zones of the body to be heated. The heating means is positioned so that heat transfer is effected through the external surface of the body. In combination with such electrical heating means, the apparatus of the invention provides means whereby the temperature of the body, such as a part of a plastic material extruding machine, may be selectively lowered by the circulation of cooling fluid about such body in contact with substantially its entire external surface. Substantially the same external surfaces of the body are employed to receive radiant heat rays through space from the heating means as those which are contacted directly by the cooling fluid.

A further object of the invention lies in the provision of heating and cooling means for a part such as the barrel of plastic material extrusion apparatus, the part being made of high strength high melting point metal such as steel, the heating means being high temperature electrical resistance elements loosely positioned upon and generally spaced from the part so as to heat such part primarily by radiation, the heating elements being so located and supported on the exterior of the part as to be readily accessible for assembly thereon and removal therefrom, substantially the identical surfaces of the part which receive the radiant rays directly from the heating means being subjected to direct contact with the cooling fluid when the part is cooled thereby.

In the first illustrative embodiments of such apparatus there are provided spaced lands on the exterior of the body, the lands being spaced apart by grooves therebetween, elongated electrical resistance heating means being positioned in the grooves and generally spaced from the side walls and roots thereof, the heating means or elements having such size and configuration relative to the grooves as to leave a narrow but significant space between the heating means and the side and bottom walls of the groove throughout a predominant part of the length of the heating element. For fast cooling of the body, when required, there is provided in such apparatus means for directing fluid onto the lands between the grooves and into the open spaces between the heating elements and the walls of such grooves, such fluid being preferably forced therepast under pressure. In the presently preferred embodiment of the apparatus of the invention the heating elements are elongated sheathed resistors of the "Calrod" or tube type, and the cooling fluid is an intimate mixture of finely divided cooling liquid dispersed in a gas such as air.

In the second embodiment of the apparatus shown herein (Figs. 11–14, inclusive), a coil-like formation of tubular electrical resistance heating element is disposed about a generally smooth surfaced extrusion head. The element is supported on the head so as to have at most line contact, and usually only short spaced lines or points of contact therewith over the length of the element. A sheath, preferably spaced from the heating element, surrounds the head, so as to reflect heat back upon the head, and also so as to provide means whereby cooling fluid may be directed into contact with substantially the entire outer surface of the head when it is necessary to lower its temperature.

The above and further objects of the invention will be more readily apparent upon consideration of the drawings accompanying the specification and forming a part thereof.

Figure 1:
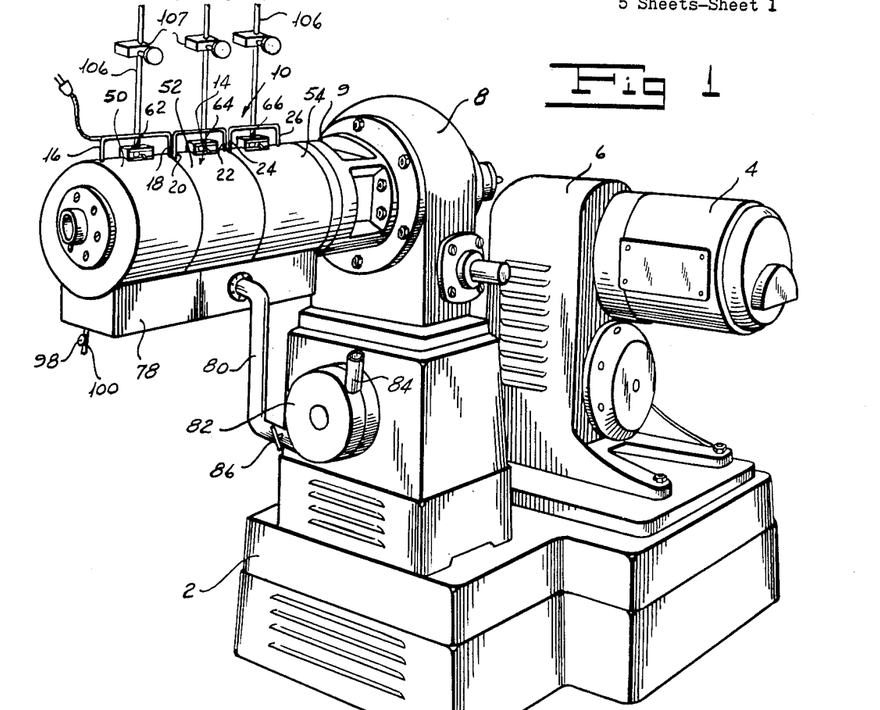
Fig. 1 is a view in perspective of a plastic material extruding machine having a screw-containing barrel which incorporates a temperature control mechanism in accordance with the present invention.

In Fig. 1 of the drawings there is shown a typical screw type continuous extrusion machine for use with plastic material such as rubber, nylon, polyethylene, etc. For clarity, the extruding machine is here shown without a die-containing delivery head. The head, as is conventional, is adapted to be bolted on the forward, delivery end of the barrel. Such machine is provided with the conventional base 2 supporting the motor 4 which drives through variable speed transmission means 6 into the gear box 8. Bolted to such gear box is the barrel, generally designated 10, such barrel having a hopper portion 9 into which the plastic material to be worked and extruded is initially introduced, the material being worked and forwarded by the screw 36 (Fig. 2) until it eventually issues through the aforesaid delivery head (not shown) on the end of the barrel.

The hard, relatively thick metal liner 34 (Fig. 2) within the main body of the cast steel barrel is forced thereinto under heavy pressure so as to have intimate contact therewith. As a result the liner is retained in the barrel practically as an integral part thereof, thereby obviating any problem of retaining the liner and presenting optimum heat transfer through the interface between the barrel body and liner.

In that portion of the barrel immediately forward of the hopper 9 the barrel is provided with a sectional cooling fluid chamber providing an insulating sheath, generally designated 14, the three sections of such sheath, reading from the rear, hopper end, of the barrel to the delivery die at the forward end thereof being designated 54, 52, and 50. The three sections of the sheath are isolated from each other, so that the amount of cooling fluid flowing through each sheath section may be regulated independently of the other sections. Each of said sheath sections also includes its individual heating element, the heating elements for sections 50, 52, and 54, being designated respectively (Fig. 9) 15, 19, and 23. Such heating elements are provided with leads thereto, shown extending vertically in Fig. 1, the leads for element 15 being designated 16 and 18, those for element 19 being designated 20 and 22, and those for element 23 being designated 24 and 26. As will be explained in more detail hereinafter, each of the heating elements is capable of individual control, either manually or automatically, so that each individual section may be brought up substantially to, and maintained at, such temperature.

Each of the above described heating elements 15, 19, and 23, is, in the preferred embodiment, an electrical resistance heater of the "Calrod" type. The section of each such heating element, for clarity, is generally designated by the reference character 30. As shown more clearly in Figs. 2, 3, and 4, the main body 32 of the barrel of the extruding machine is provided on its external peripheral surface substantially throughout its length with a helical land 38, adjacent turns of such land being spaced by grooves 40 lying therebetween. The resistance units 15, 19, and 23 are each disposed in the grooves 40 in their respective sections of the barrel 32, adjacent leads from the resistance units, such as the leads 18 and 20 shown in Fig. 4, lying immediately adjacent each other in the same groove, so that the electrical resistance heating units are distributed substantially uniformly along the length of the barrel.

Figure 3:
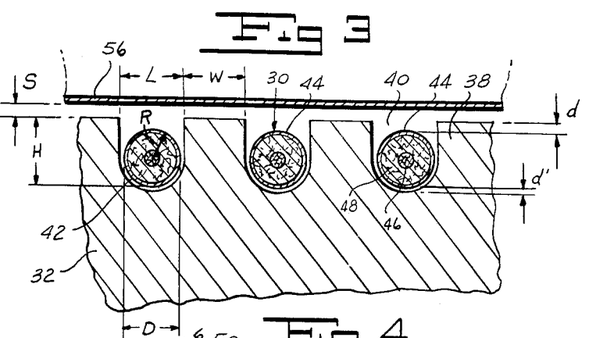
Fig. 3 is an enlarged fragmentary view of a part of the barrel at the location of the ribbed and grooved exterior of the main part of the barrel. such view being a cross-section similar to Fig. 2.
Figure 4:
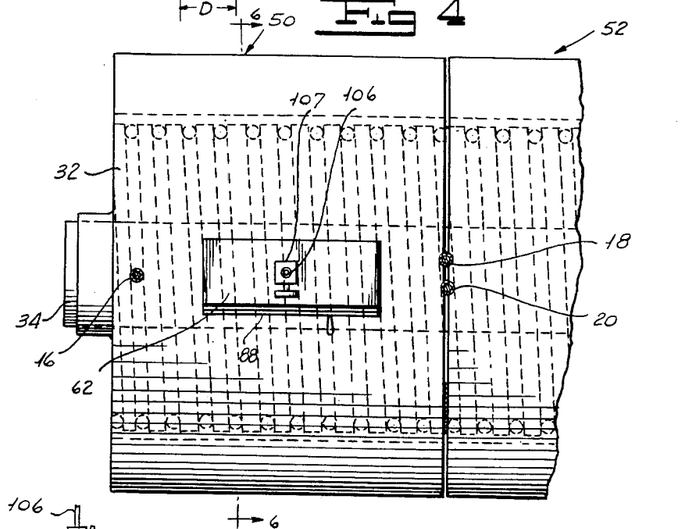
Fig. 4 is a view in plan of the preferred embodiment of the barrel and the sheath thereabout in the section thereof adjacent the delivery die.

As shown more clearly in Fig. 3, the preferred cross-section of heating element 30 is circular, such element being provided with a sheath 44, preferably made of stainless steel, the central, electrically conducting, resistor wire 46 being spaced from such sheath by the interposed electrically insulating material 48. In the embodiments shown, the grooves 40 have approximately straight side walls the elements of which lie approximately normal to the periphery of the barrel 32. The root 42 of each groove 40 is approximately semicircular in axial cross-section, such root having a radius R which somewhat exceeds the radius of the "Calrod" element 30. In the drawings, for clarity of illustration the difference between the radius R and the radius of element 30 is exaggerated. In accordance with the invention, the cross-section of grooves 40 and the cross-section of the heating element 30 are so related to each other as to leave within the grooves, when the heating element is mounted therein, a substantial space at least at one side of the groove and, as shown, preferably at both, throughout the predominant part of the length of the groove. In Fig. 3 the top surface of element 30 is shown lying a distance $d$ below the tops of the lands 38. With such construction there is provided a substantial space within each groove for the reception of the cooling fluid directed thereinto by means to be explained, and also there is provided a substantial height of land side wall at each side of the heating element, to intercept the radiant heat rays emanating from such element, both directly and as reflected from the inner wall 56 of the sheath 50. As a practical lower limit of height of the lands, when the heating element is circular in cross-section, the tops of the lands may lie flush with the top of the heating element 30. From such lower limit, the lands 38 may increase in height relative to the diameter of the element 30 to the relationship shown in Fig. 3 and past such relationship, depending upon the speeds and amounts of heating and cooling effects required. The width L of the grooves 40 is, in the embodiment shown, somewhat less than the width W of the lands 38. Such relationship is not critical, however, the width W depending upon the length of the barrel and the length of heating element required to be disposed upon such barrel to give the heating capacity and speed of heating desired for the particular application in hand, and should be sufficiently wide to conduct heat at the required rate of flow both during the heating and cooling operations.

As shown in Fig. 3 the width L of the grooves somewhat exceeds the diameter D of the heating element 30. Also as shown a space having a width $d'$ exists between the bottom of the turn of element 30 at the right and the bottom of the groove in which it is positioned. In a typical apparatus made in accordance with the invention the width L of the groove is .500 inch and the diameter D of element 30 is .440 inch, giving an average of .030 inch between the side wall of the groove and the sheath of element 30.

The groove 40 in the barrel may be formed during the casting of the barrel. Alternatively, the thus cast barrel may be subsequently rough finished by a machining operation. Further, the groove 40 may be formed entirely by rough machining. The spiral heating elements 15, 19, and 23 are preferably formed by being wound on a mandrel spirally grooved in a manner to conform in pitch and generally in the inner diameter of the helix to the groove on the barrel. The thus formed spiral heating elements are unscrewed from the mandrel and are mounted on the barrel by being screwed endwardly thereonto. Preferably the inner diameter of the helix of the mandrel slightly exceeds the inner diameter of the helical groove on the barrel, so that the thus formed helical heating elements, which have an inherent spring-back, may be easily threaded or screwed onto the barrel. Even if the inner diameter of the helical groove on the mandrel were the same as that of the groove in the barrel, however, the heating element thus formed could be screwed onto the barrel because the inherent spring-back of the "Calrod" element upon being bent causes its helix to be of a larger diameter than the helix of the groove in the mandrel. Further, the element may be formed by being coiled directly into the groove on the barrel, here again the spring-back of the element insuring adequate spacing between it and the walls and root of the groove.

The inner diameter of the helical heating elements 15, 19, and 23 is preferably such that when the elements are at the average temperature of the barrel under working conditions, but are not themselves heated by electricity, a space about equal to the average space between the elements and the side walls of the groove exists between the inner surfaces of the elements and the root of the groove. The space between the inner surfaces of the elements and the root of the groove grows larger when the elements 15, 19, and 23 are heated by the passage of electricity therethrough, due to expansion of the elements when so heated. Thus even if the elements could be made to lie snugly in contact with the root of the groove in the barrel when initially mounted on the barrel in the cold, such elements in the main would pull at least slightly away from the bottom of the groove under operating conditions, insuring the proper spaced relationship between the heating element and the bottom of the groove.

The described relations of the diameter of the section of the heating element 30 and of the inner diameter of its helix relative to the width L of the groove 40 and the inner diameter of the helix of the groove cause the heating element throughout by far the predominant part of its length to lie separated from the bottom and side walls of the groove 40 even though it is supported directly therein. The "Calrod" element varies somewhat in diameter angularly about its axis. The groove 40 preferably is at most merely rough machined. The spiral into which element 30 is formed is not an absolutely true helix because of the tendency of the sheath of the element to spring back in both radial and axial directions. As a result, the helical element 30 contacts the bottom and side walls of groove 40 merely at points or short lines which in the main are widely spaced from each other along the length of the element 30, by far the greater part of the length of element 30 being suspended in the groove 40 free from contact therewith.

Figure 2:
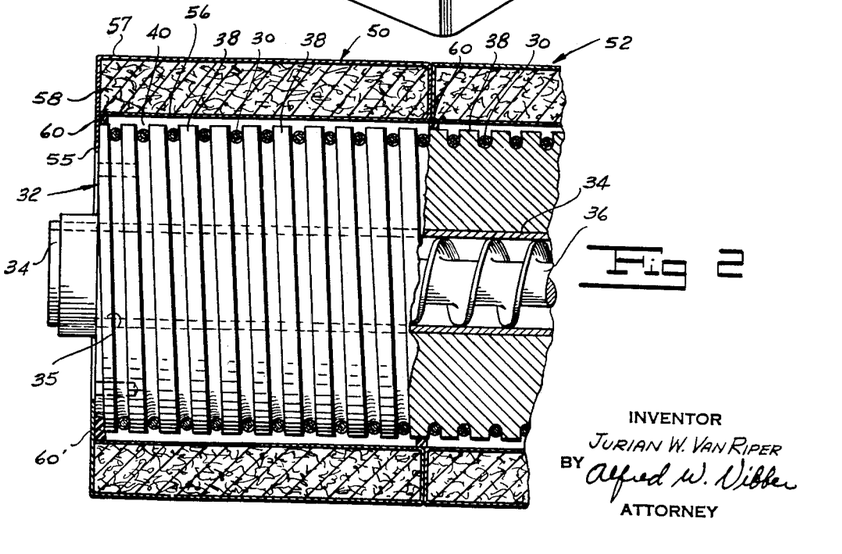
Fig. 2 is a view in horizontal axial cross-section through the portion of the barrel and the sheath about it adjacent the delivery end of the barrel of the extruding machine shown in Fig. 1.

Each of the sections of sheath 14 is constructed in the same manner, except that the forward end section has at its outer end a radially extending flange 55 overlapping the forward end of the barrel. Section 50 of the sheath, which is typical, is provided with an external shell 57, as shown in Fig. 2, such shell having a cylindrical inner sleeve or barrier 56 which, in the first disclosed embodiment of the apparatus, is spaced from the outer surfaces of lands 38 a distance S (Fig. 3). The space between the outer shell 57 and the inner sleeve 56 is filled with heat insulating material 58, such as magnesia. The inner shell 56 is spaced from the barrel by means of the asbestos wicking rings 60 disposed about the barrel at the ends of the sheath sections so as to seal the sheath on the barrel at the ends thereof and also at the ends of adjacent sections. In positions where the helical groove in the barrel exterior runs out to the surface and is not occupied by the heating element, additional wicking may be provided if required to complete such seal of the sheath to the barrel.

Figure 5:
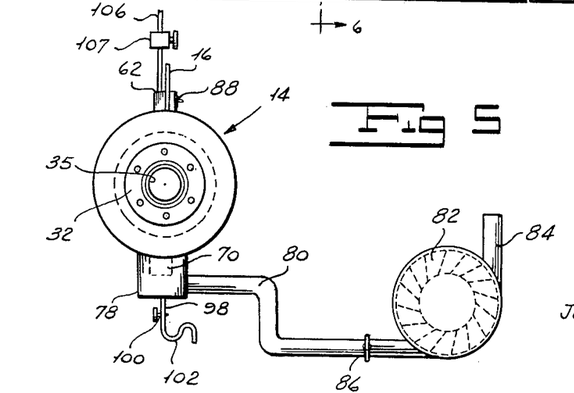
Fig. 5 is a somewhat diagrammatic end view of the embodiment of the extrusion barrel shown in Fig. 4 and the cooling fluid delivery system associated therewith, the view being taken in the direction from the exit end of the barrel toward the main part of the extruding machine.
Figure 9:
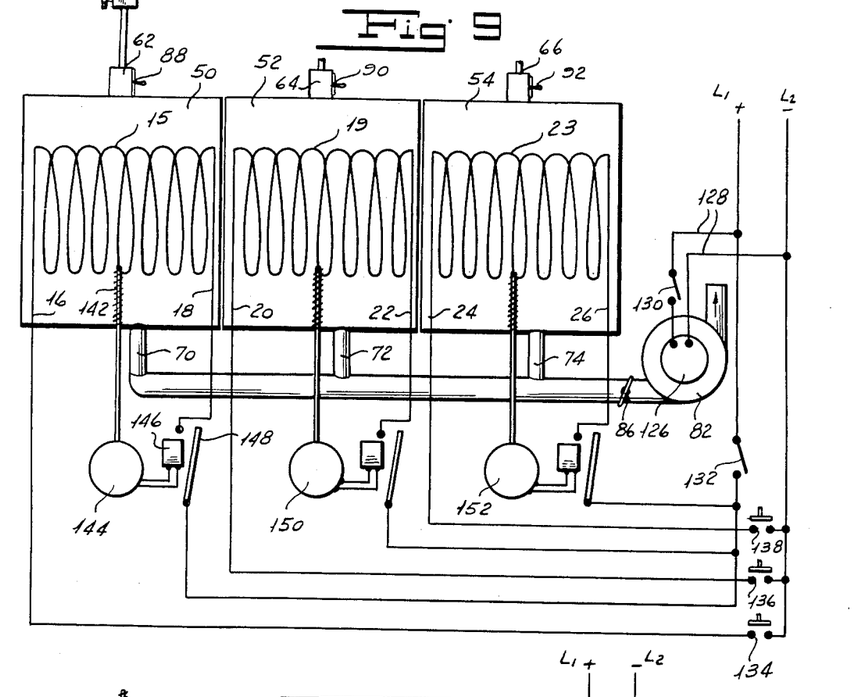
Fig. 9 is a somewhat diagrammatic view in vertical axial section through the barrel and sheath associated therewith in that embodiment shown in Figs. 1–5, inclusive, the view indicating somewhat diagrammatically the manner of manifolding of the exit ends of the fluid cooling shields about the various sections of the barrel, and also the wiring of the various heating elements and of their manner of control.

Each of sheath sections 50, 52, and 54 is provided, respectively, with an air inlet means 62, 64, and 66, as shown in Figs. 1 and 9. Such sheath sections are provided, respectively, with air outlet means 70, 72, and 74 (figs. 5 and 9). The air inlet for each such section is provided, respectively, with a controllable damper means, 88, 90, and 92, the damper 88 for inlet 62 being shown in Figs. 4 and 5. The inlet means 62 is simply a sheet metal enclosure, the bottom end of which communicates with the space between the lands of the barrel and the inner shell 56 of the sheath. A side wall of such structure 62 is provided with an opening therethrough and with guideways bordering such opening, such guideways carrying the slidable damper member 88 whereby the opening may be completely closed or may be opened in varying degrees, as desired.

In some instances air admitted through means 62, 64, and 66 may be sufficient alone to provide adequately rapid cooling of the barrel for the purpose in hand. It is usually preferred, however, to supply an intimate mixture of finely divided cooling liquid in a gas to the fluid cooling inlet means. At the top of each of structures 62, 64, and 66 there is provided a liquid spray jet 104 supplied through pipe 106 with liquid such as water. Such structure is shown most clearly in Fig. 6 in connection with housing 62. The pipe 106 is provided with a shutoff valve 107. The fine, high velocity, jet of liquid 108 impinges upon a target 110 suspended centrally of structure 62 on the radially disposed arms 112. As a result, the housing 62 is filled with very finely divided droplets of water, which become intimately mixed with the inrushing current of air through opening 96 in the side wall of such structure.

The resulting mixture of liquid and gas, coming into contact with the outer surfaces of lands 38, the predominant part of the surfaces of the side walls thereof within grooves 40 and both above and below elements 30, and the predominent part of the roots of the grooves, will rapidly cool the barrel of the extruding machine. The cooling effect of the gas in this instance is very greatly supplemented by the evaporative effect of the liquid droplets therein. Not only is such mode of cooling the barrel much faster than that effectively obtained by the use of air alone, but for high temperature work it is to be preferred to the use of a cooling liquid, to be described in connection with Fig. 8, since there is no danger of explosion in, and damage to, the apparatus using the mixture of gas and liquid spray, even if a stoppage in the flow of cooling medium past the heated barrel should somehow occur.

In the embodiment first shown, the cooling fluid, in this instance a mixture of air and finely divided water, is directed through the grooves in the barrel and the space between the inner shell and the outer surfaces of the land by a suction blower connected to the exit pipe of each section. As shown in Figs. 1 and 5, each exit pipe of the various sections depend into the manifold structure 78, which is in the nature of a box connected at its upper end to the outer surface of the sheath sections. The suction pipe 80 is connected to one side of structure 78 above the bottom thereof, such pipe containing a manually controllable inlet choke or damper 86. The blower 82 is driven by the motor 126 (Fig. 9), and impels air drawn through the various sheath sections outwardly through the pipe 84. The amount of air drawn through each section depends upon the setting of the individual dampers 88, 90, and 92, and the aggregate amount of air impelled through such sections depends upon the setting of the choke damper 86. To eliminate water from the blower 82 (Fig. 5) a pipe 98 is connected to the bottom of structure 78, the pipe leading through a shutoff valve 100 and a trap 102 to a discharge drain, not shown. Thus whatever moisture settles in the bottom of structure 78 may periodically be drained away.

A diagrammatic piping and wiring drawing of the apparatus thus far described is shown in Fig. 9. Motor 126 for blower 82 is supplied from electric leads $L_1$ and $L_2$ through the wires 128, there being a manually operated switch 130 provided in one of the motor leads. The blower motor may thus be shut off when desired. Control of the cooling of the various sections of the barrel is taken care of by the setting of dampers 88, 90, and 92, of the individual sheath sections and by the setting of the choke damper 86 in the feed pipe to the blower. The electrical resistance heating elements 15, 19, and 23 are connected, as shown, in parallel to the leads $L_1$ and $L_2$. Individual manually operated switches 134, 136, and 138, respectively, are provided for each such element. In addition, a main switch 132 is provided to open the circuit to all the heating elements, if desired.

Preferably each of the electrical resistance heating elements is under the automatic control of a thermostat associated with its particular section of the extruding machine barrel. Since the control for each section is the same as that for the others, detailed discussion of it will be restricted to that associated with element 15. As shown, a thermocouple 142 is disposed in a small bore in the barrel 32 so that its inner end lies adjacent to liner 34 of the barrel. By this means, sensitive measurements of the temperature of the material passing through bore 35 of the liner is afforded. The leads from thermocouple 142 are led to the indicating thermostat 144, which in turn actuates a relay 146. Relay 146 operates the switch 148 in one of the leads to the resistance element 15, whereby when the temperature registered by the thermocouple exceeds the preset temperature on instrument 144, switch 148 is opened.

As indicated, similar thermocouples and similar indicating thermostats 150 and 152, are provided for each of heating elements 19 and 23, respectively.

It will be appreciated that the embodiment of the temperature control apparatus thus far described is characterized by its ease of operation and control, and by its flexibility of operation, both in a cycle performed upon one plastic material and in its ready adaptability for operation upon different kinds of plastic materials. In a typical operation, the indicating thermostats will be set initially to the desired temperature and the barrel will thus be heated. During such initial heating period the cooling system will be in inoperative condition, that is, the blower 82 will not be running, or dampers 88, 90, and 92, or damper 86, will be closed. After the barrel is thus initially heated, if it is desired to reduce the temperature of one or more sections of the barrel, the appropriate thermostats are lowered in their temperature settings, the blower is turned on, and the air dampers and the cooling liquid valves of the section or sections to be cooled are opened to the desired degree. Under steady conditions when cooling is required, the individual dampers 88, 90, and 92 may be opened to predetermined amounts, the blower 82 may be continuously operated, and the barrel section may be subjected to cooling, when necessary, by opening the main damper 86 and by opening the cooling liquid valve corresponding to valve 107 for such section or sections. With some materials, it may be desired, under steady operating conditions, to shut off the heating elements in a section or sections, and to subject such section or sections to continuous cooling effects.

Figure 6:
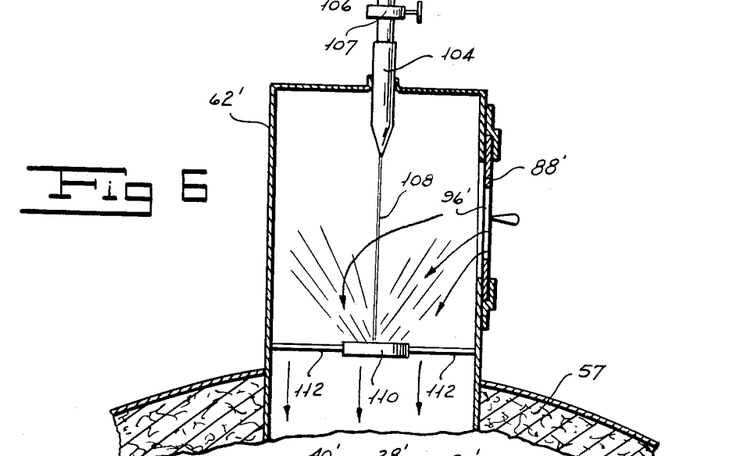
Fig. 6 is a view in vertical cross-section through the air inlet means on top of one section of the sheath about the barrel of the apparatus of Figs. 1–5, inclusive, the section being taken along line 6—6 in Fig. 4, such view showing the air inlet means wherein cooling liquid is intimately mixed with the incoming air.
Figure 10:
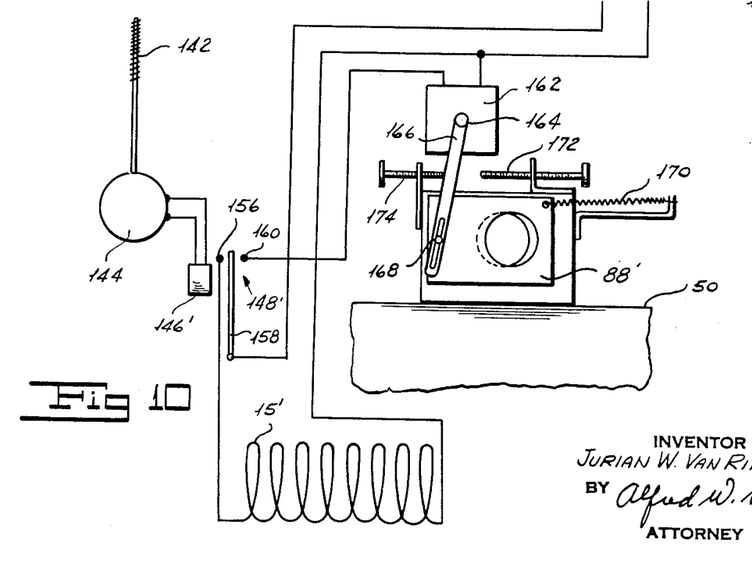
Fig. 10 is a wiring diagram of an alternative embodiment of the apparatus showing apparatus for automatically controlling the heating element and the cooling means for a section of the extruding machine barrel.

Although the inlet dampers for the individual sheath sections have been shown and described as being manually operated, in some instances, particularly where air alone is employed as the cooling agent, the liquid spray means shown in Fig. 6 either being shut off or omitted, it may be desired to provide means automatically to open and close such dampers between preset limits. An apparatus for doing this is diagrammatically shown in Fig. 10, wherein apparatus is shown for automatically controlling the electrical resistance 15 at the exit end of the barrel and for controlling the position of slidable damper 88' for the first section 50 of the sheath. The thermocouple 142 will, as before, be inserted in a bore radially through the main barrel into proximity to the lining member therein, the leads from such thermocouple extending to the indicating thermostat 144 which controls the operation of relay 146'. The relay controls the switch 148', so that when the temperature of the barrel is lower than that for which thermostat 144 is set, a closed circuit is effected from leads $L_1$ and $L_2$ to the coil 15' through fixed contact 156 of the switch and the movable contactor 158. When the temperature at thermocouple 142' has risen sufficiently, that is, to the predetermined temperature set on instrument 144, the relay 146' is operated to break the circuit through contact 156 and contactor 158 and to effect a closed circuit through fixed contact 160 and contactor 158. This energizes the torque motor 162 to turn its shaft 164 clockwise, thereby carrying with it the crank arm 166. The latter impels the slidable damper 88' from its normally closed position, at the right in Fig. 10, to the position shown, at the left in Fig. 10. The connection between the damper and the arm 166 is the well known slot and pin connection 168. The damper is normally urged constantly to the right by means of the coil spring 170. The end positions of the damper, in both directions of travel, are determined by the adjustable stop members 172 and 174 cooperating with the arm 166, member 172 determining the terminal point of travel of the damper to the right, and member 174 determining the length of its travel to the left. It will be apparent that when the temperature of the barrel as registered by thermocouple 142 falls below the temperature preset upon instrument 144, relay 146' is actuated to break the circuit through contactor 158 and contact 160, whereupon the heating circuit it again energized and the cooling means is shut off since torque motor 162 is deenergized and damper 88' is moved to closed position.

Figure 8:
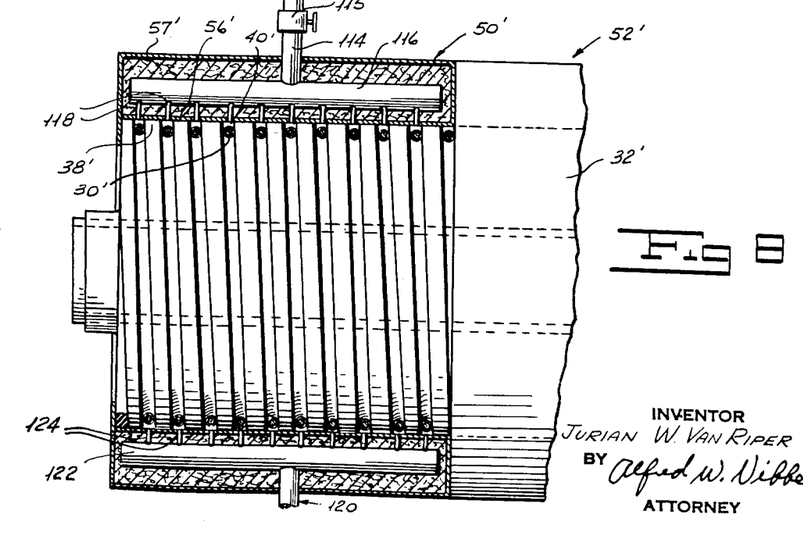
Fig. 8 is a view in vertical axial section through a cooling means of alternative construction associated with the barrel, such cooling means being adapted for the introduction of cooling fluid such as liquid into each individual groove in the main body of the barrel.

In Fig. 8 there is shown an alternative embodiment of the heating and cooling apparatus of the present invention, such alternative embodiment being capable of use with either a gaseous or a liquid cooling medium. In such construction, the inner shell or barrier 56' of the sheath is disposed in intimate contact with the outer surfaces of lands 38'. The cooling medium receiving space is therefore confined to that existing in the grooves 40' above the heating element 30'. To secure sufficient ingress and outflow of the cooling medium employed with this embodiment, there is employed an inlet manifold 116 supplied through pipe 114 with fluid cooling medium, there being an inlet pipe 118 leading off the manifold into each groove 40' in one location of the barrel parallel with the axis thereof. At another location on the barrel, preferably diametrically opposite the location of manifold 116, there is positioned the outlet manifold 122 which is similar to manifold 116. Such manifold, which communicates with the grooves 40' through the individual pipes 124, as shown, is exhausted to a sump (not shown) through pipe 120.

Figure 7:
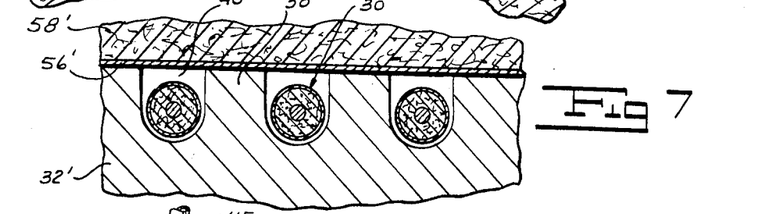
Fig. 7 is a fragmentary view in cross-section similar to Fig. 3 of an alternative construction of the sheath positioned about the main portion of the extruding machine barrel.

As indicated, with the apparatus of Figs. 7 and 8 the fluid cooling medium may be a gas, a mixture of a gas and a liquid in finely divided state, or a liquid. If a purely gaseous cooling medium is employed, it is preferred that it be introduced into the grooves in the barrel under high pressure. When a mixture of gas and finely divided liquid is used, it is not necessary that the pressure of the medium be high, and so it may be sucked therethrough in the same manner as indicated in Fig. 5. When a liquid is employed, it is desirable that the outlet manifold 120 be placed at the bottom of the barrel and that the inlet manifold 116 be placed at the top thereof, for rapid draining. When liquid is employed, a shutoff 115 in pipe 114 will be provided. Such shutoff may be of the air-bleeding type, whereby, when the flow of liquid cooling medium to the cooling spaces is shut off, such spaces will immediately be drained of liquid and filled with air. As a result of the above described construction, the transmission of heat into the barrel 32, and thus to the plastic material contained in the bore thereof, and the abstraction of heat from such barrel, and thus from the plastic material in the bore thereof, are rapid and uniform.

In Figs. 11–14, inclusive, the heating and cooling means of the invention is shown applied to a cross-delivery head 176 attached to the end of an extrusion barrel of a screw-type machine, such as that shown in Fig. 1, by means of studs 180 passing through flange 178 of the head and screwed into the end of the barrel. The head 176 is provided with an elongated tubular electrical resistance heating element, generally designated 190, disposed about it, with a surrounding sheath 182 spaced from the head and from the element forming a heat insulating and reflecting barrier, and means to direct cooling fluid into such space. Instead of being disposed in grooves on the outer surface of the head, however, the heating element merely lies supported on the relatively smooth and unbroken outer surface thereof, having light contact with such outer surface at randomly spaced points or short lines along the length of the element.

The head 176 has a cavity 184 within it aligned with the bore 35 through the barrel 32 of the extrusion machine. A bushing 186, laterally open within the cavity 184 in the head and extending across the cavity has an entry guide 187 for a wire to be sheathed by the machine, the other end of the bushing forming the exit guide 188 for the larger diametered, sheathed wire. The head 176 has a generally smooth cup-shaped external surface with the exception of the flat left-hand side thereof as it is shown in Fig. 12.

The head is provided with a "Calrod" type heating means 190 supplied with current through leads 192 and 194, extending horizontally across the outside of the end of sheath 182, such leads being provided with the connector 196. Leads 192 and 194 connect, respectively, with horizontal portions 196 and 198, which extend from the front end of the head to the rear end at flange 178. The heating element is then reversely bent at both such locations to run toward the front of the head in portions 200 and 202, which in turn connect with rearwardly extending runs 204 and 206. A sufficient number of such reverse runs, at the top and bottom of the head, are employed to give adequate coverage of the surface of the head and to provide the desired heat supplying capacity. The portions of heating element 190 at the top and bottom of head 176 and remote from leads 192 and 194 are connected by the vertical run 208 of the heating element, which extends across the front end of the head 176 aligned with the face 190.

The element 190 is bent into the shape shown so as to fit the head 176 fairly snugly when cold. Because the element 190 does not bend absolutely uniformly, and because it expands when heated, under operative heating conditions the element is supported on head 176 by light contact therewith at points or short lines randomly spaced along the length of the element. At other zones the element 190 lies close to, but spaced from the head.

Figures 11, 12, 13, 14:
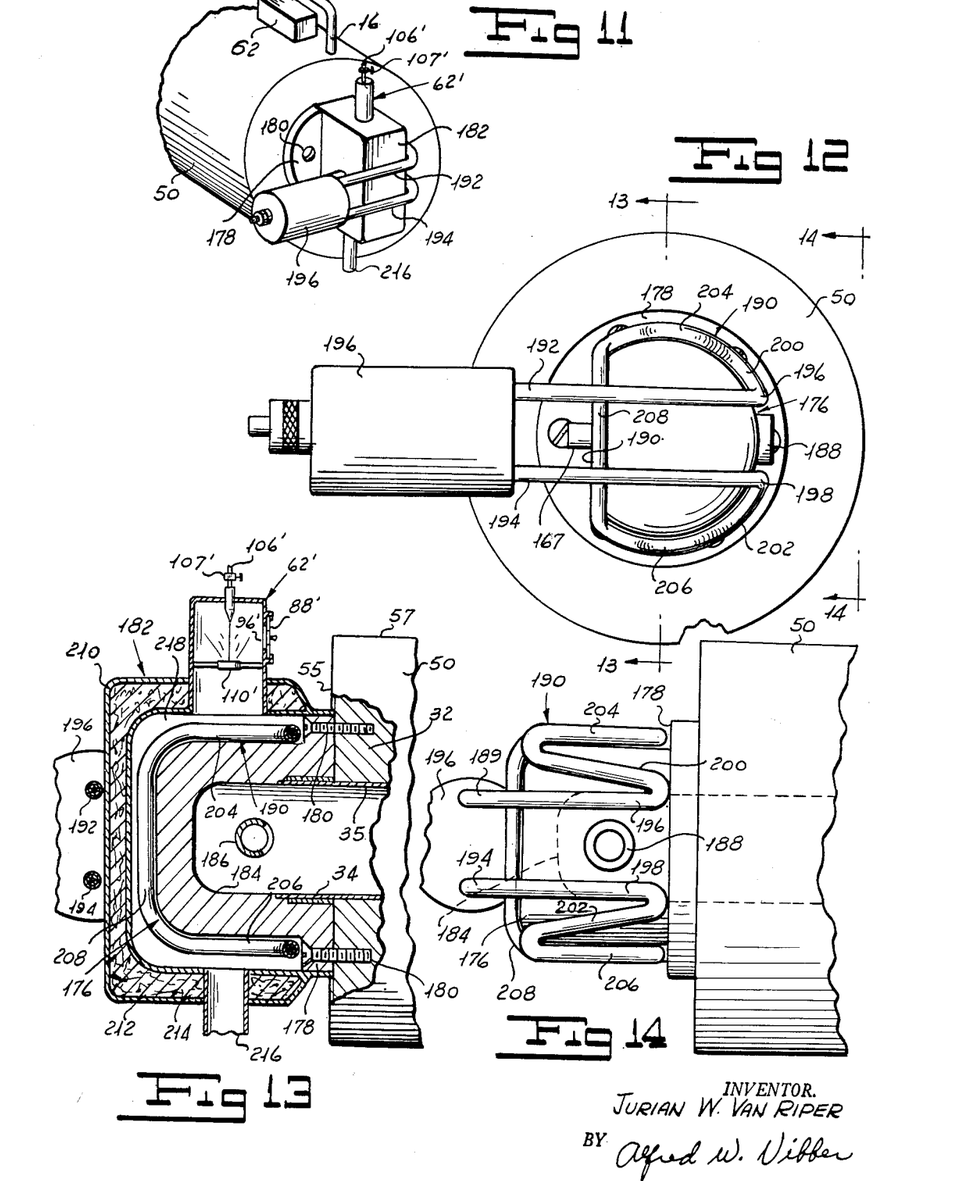
Fig. 11 is a fragmentary view in perspective of the barrel of the extruding machine having a wire sheathing, cross-delivery, head thereon provided with a heating and cooling means in accordance with the invention.
Fig. 12 is a view in end elevation of the barrel looking toward the head thereon, the resistance heating means being shown in position on the head but the sheath about the head and heating means being removed.
Fig. 13 is a view in vertical axial section through the head and end of the barrel, the section being taken along the line 13—13 in Fig. 12.
Fig. 14 is a fragmentary view in side elevation from line 14—14 in Fig. 12 of the barrel and head with the heating means in position but with the head enclosing sheath removed.

The sheath 182 is composed, as shown in Fig. 13, of an inner barrier member 210, spaced from the outer surface of element 190 at the top and bottom and preferably from run 208 at the front of the head as shown, and an outer wall 212, the space between members 210 and 212 being filled with a heat insulating material 214 such as magnesia. Member 210 is preferably made of an effective radiant heat ray reflecting material such as stainless steel.

The sheath 182 serves to reflect heat from element 190 back onto body 176 as well as to prevent undue heat losses therefrom. Further, it serves to direct a cooling fluid from an inlet structure 62' on top of the sheath into contact with the outer surface of the head. Such structure 62' may be the same as that shown in Fig. 6, supplying a mixture of finely divided liquid in a gas. Corresponding parts of means 62' are designated by the same reference characters as those in Fig. 6 with an added prime. An outlet conduit 216 at the bottom of sheath 182 provides for the exhaust of the cooling fluid therefrom; such conduit 216 may be connected, if desired, to an exhaust fan such as 82 (Figs. 1 and 5).

As in the embodiments of Figs. 2-8, inclusive, that of Figs. 11-14, inclusive, employs substantially the identical surfaces to receive radiant heat rays, here both directly and as reflected, as those directly contacted by the cooling fluid. Consequently the presence of neither the heating nor the cooling means detrimentally affects the action of the other.

The heating of the barrel by the "Calrod" or equivalent tubular heating units in the grooves thereon, in the embodiments of Figs. 2-8, inclusive, and of the head by the heating units disposed thereon in the embodiment of Figs. 11-14, inclusive, is effected primarily by radiation, to a smaller extent by convection, and to a much smaller degree by conduction. As to the embodiments of Figs. 2-8, inclusive, the location of the heating element in the deep grooves on the barrel insures the direct interception of a major portion of the radiant rays from the heating element by the structure of the barrel 32. The major portion of the remainder of such rays are reflected back onto barrel 32 by the sleeve or barrier 56, which may be made of stainless steel to add to this effect and for corrosion resistance properties.

In the embodiment of Figs. 11-14, inclusive, a portion of the direct rays from the heating element are received by the outer surface of the head, the major portion of the remainder being reflected back onto the head by the inner member of the sheath thereabout. In all the disclosed structures there is also some heating effect contributed by convection currents in the air in contact with the exposed outer surfaces of the heating elements and with the outer surface of the part being heated. This likewise is quite efficient, because of the substantially closed spaces within which the barrel and the head are located. Heating of the barrel and head by conduction from the sheath of the heating element is confined to those locations in which the element contacts the body of the barrel or head. As explained, such locations of contact are very small in extent and are generally widely and randomly spaced. Because the contact is caused only by the necessity of support for the heating element, the unit pressure between the heating element and the barrel or head is small and thus heat transfer by conduction at the locations of contact is poor. Consequently substantially the entire surface of the sheath of the heating element is at a high, efficiently radiating, temperature, when the element is energized. The described heating means is very quickly responsive to its controls, and particularly cooperates with the cooling means to allow rapid cooling of the barrel or head when desired. Marked heating of the barrel, head, or other part on which the heating means is used ceases when the heating element cools substantially, as below dull red heat, since the element then ceases to be an efficient radiator of heat rays. Consequently significant heating of the machine part ceases soon after the heating element is deenergized, and much before it has cooled to the then external temperature of such machine part.

The cooling effect possible with the disclosed structures used as described is, as indicated, rapid and substantially uniform. In the structures of Figs. 2-8, inclusive, the exposure of a predominant part of the total area of the side walls and roots of the grooves, as well as the entire outer surfaces of the lands in the first described embodiment, both such surfaces being distributed uniformly over the surface of the barrel, results in the rapid, uniform abstraction of heat from the barrel 32 when cooling fluid is circulated in the described manner past the exterior of the barrel. The narrow but substantial spacing of the heating element 30 from both the side walls and root of the groove over a predominant part of the length of the element causes the element to function as a baffle, so that the cooling fluid flows into intimate contact with the side walls and roots of the grooves, scouring away the layers of air next to these surfaces of the barrel to produce very fast, efficient, cooling of the barrel. It will be apparent that an increase in the depth of the lands on the barrel relative to the diameter of the heating element in the grooves, beyond that shown in the illustrative embodiment, which will be desired in some instances, will result in an increased heat abstracting rate and total capacity in the resulting cooling apparatus for the barrel or other part.

The cooling of the extrusion head of Figs. 11-14, inclusive, is also rapid, efficient, and substantially uniform. The locations of contact between the heating elements and the head are, as noted, generally randomly spaced short lines or points. The remainder of the outer surface of the head, those portions radially inwardly of the heating element not contacted by it, and the parts between the runs of the element, is exposed to the action of the cooling medium when it is introduced within the sheath. As with the structures of Figs. 2-8, inclusive, the heating element acts as a baffle to direct the cooling fluid to the zone at which the heating element lies closest to, or contacts, the outer surface of the head. Thus the presence of the heating element does not substantially detract, either locally or in overall effect, from the efficiency of the cooling medium in abstracting heat from the part.

Whereas for purposes of illustration I have shown and described preferred embodiments of temperature control mechanism, more particularly temperature control mechanisms for extrusion apparatus, of my invention, it is to be understood that such embodiments are illustrative only and that within the teaching of the invention the apparatus may be varied considerably as to details. Thus, for example, the choice of the number of sheath sections surrounding the barrel or other part to be selectively heated and cooled depends upon the length of such part, the permissible lengths of the heating elements and thus of their resistances, and the lengths of the zones which it is desired to control individually as to heating and cooling effects. The invention is, therefore, to be defined by the scope of the claims appended hereto.

This application is a continuation-in-part of application Serial No. 214,081, filed March 6, 1951, now abandoned.

I claim as new the following:

1. Apparatus comprising a body to be selectively heated and cooled, an elongated high temperature radiant heating element for heating the body, said element having an electrically insulated cylindrical sheath, the sheath of the element lying outside a surface of the body with a portion of the surface of the element closely adjacent to the said surface of the body but spaced from said surface of the body throughout by far the predominant part of the length of the element, the apparatus including means acting as a heat confining barrier member spaced from the surface of the sheath of the heating element remote from said surface of the body and forming with the body a substantially closed space enclosing the element, and means to pass a cooling fluid through said space and directly over substantially the entire said surface of the body and substantially the entire surface of the heating element within the said space.

2. Apparatus comprising a hollow metal body to be selectively heated and cooled thereby to maintain material passing therethrough within a predetermined temperature range, an elongated high temperature radiant heating element for heating the body, said element having an electrically insulated cylindrical sheath, the sheath of the element lying outside a boundary surface of the body with a portion of the surface of the element closely adjacent to the said boundary surface of the body but spaced from the said boundary surface of body throughout by far the predominant part of the length of the element, a heat insulating barrier member spaced from the surface of the sheath of the heating element remote from said boundary surface of the body and forming with the body a substantially closed space enclosing the element, and means to pass a cooling fluid through said space and directly over substantially the entire said boundary surface of the body and substantially the entire surface of the heating element within the said space.

3. Apparatus comprising a metal body to be selectively heated and cooled, an elongated high temperature radiant electric heating element for heating the body, said element having an electrically insulated cylindrical sheath, the sheath being directly supported on the outer surface of the body with its inner surface close to the outer surface of the body, the sheath contacting the body at random points along the length of the element and being closely adjacent to but spaced from the body throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, and directly over substantially the entire said outer surface of the body and over substantially the entire surface of the heating element within the said space.

4. Apparatus comprising a part for a plastic material extruding machine, said part being a hollow metal body adapted selectively to heat and cool plastic material passing therethrough, an elongated high temperature radiant heating element for heating the body, said element having an electrically insulated cylindrical sheath, the sheath of the element lying outside the outer surface of the body with the inner surface of the element closely adjacent to the outer surface of the body but spaced from the body throughout by far the predominant part of the length of the element, a heat insulating barrier member spaced from the outer surface of the sheath of the heating element and forming with the body a substantially closed space enclosing the element, and means to pass a cooling fluid through said space and directly over substantially the entire outer surface of the body and substantially the entire surface of the heating element within the said space.

5. Apparatus comprising a metal body to be selectively heated and cooled, an elongated high temperature radiant electric heating element for heating the body, said element having an electrically insulated cylindrical sheath, the sheath being supported outside a boundary surface of the body with the predominant part of the surface of the element close to the said boundary surface of the body, a heat insulating barrier member spaced from the surface of the sheath of the heating element remote from the boundary surface of the body and forming with the body a substantially closed space enclosing the element, means for producing a cooling fluid consisting of a suspension of finely divided liquid particles in a gas, and means to pass such cooling fluid through said space and directly over substantially the entire boundary surface of the body and substantially the entire surface of the heating element within the said space.

6. Apparatus comprising a metal body to be selectively heated and cooled, an elongated high temperature radiant electric resistance heating element for heating the body, said element having an electrically insulated cylindrical sheath, the element substantially encircling the body and being positioned with the sheath of the element lying with its inner surface closely adjacent to the outer surface of the body but spaced from the body throughout by far the predominant part of the length of the element, a heat insulating barrier member spaced from the outer surface of the sheath of the heating element and forming with the body a substantially closed space enclosing the element, and means to pass a cooling fluid through said space and directly over substantially the entire outer surface of the body and substantially the entire surface of the heating element within said space.

7. Apparatus comprising a body to be selectively heated and cooled, the body having spaced lands encircling the body on the exterior surface thereof, said lands being spaced apart by grooves therebetween, an elongated high temperature radiant electric resistance heating element for heating the body, said element having an electrically insulated cylindrical sheath, the sheath of the element having a diameter somewhat less than the width of the groove, the element encircling the body and lying within each groove with the sheath on the element lying with its inner surface closely adjacent to the root of the groove but spaced from such root throughout by far the predominant part of the length of the element, a heat insulating barrier member spaced from the outer surface of the sheath of the heating element and forming with the body a substantially closed space enclosing the element, and means to pass a cooling fluid through said space onto the outer surface of the body, substantially the same surfaces of the body which receive the radiant heat rays through space from the heating element being directly contacted by the cooling fluid.

8. Apparatus comprising a body to be selectively heated and cooled, the body having spaced lands encircling the body on the exterior surface thereof, said lands being spaced apart by grooves therebetween, an elongated high temperature radiant electric resistance heating element for heating the body, said element having an electrically insulated cylindrical sheath, the sheath of the element having a diameter somewhat less than the width of the groove, the element encircling the body and lying within each groove with the sheath of the element lying with its inner surface closely adjacent to the root of the groove but spaced from such root throughout by far the predominant part of the length of the element, a heat insulating barrier member spaced from the outer surface of the sheath of the heating element and forming with the body a substantially closed space enclosing the element, means for producing a cooling fluid consisting of a suspension of finely divided liquid particles in a gas, and means to pass such cooling fluid through said space onto the outer surface of the body, substantially the same surfaces of the body which receive the radiant heat rays through space from the heating element and all that surface of the heating element which is spaced from the body being directly contacted by the cooling fluid.

9. Apparatus comprising a part for a plastic material extruding machine, said part being a hollow metal body adapted selectively to heat and cool plastic material passing therethrough, the body having spaced lands encircling the body on the exterior surface thereof, said lands being spaced apart by grooves therebetween, the walls of the grooves lying substantially radial of the body and being of substantial height, the roots of the grooves being generally semi-circular in section, an elongated high temperature radiant electric resistance heating element for heating the body, said element having an electrically insulated cylindrical sheath, the sheath of the element having a diameter somewhat less than the width of the groove, the element encircling the body and lying within each groove with the sheath of the element lying with its inner surface closely adjacent to the root of the groove, the sheath contacting the walls and root of the groove at random points along the length of the element, the sheath being spaced from the walls and root of the groove throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, substantially the same surfaces of the body which receive the radiant heat rays through space from the heating element and all that surface of the heating element which is spaced from the body being directly contacted by the cooling fluid.

10. Apparatus comprising a part for a plastic material extruding machine, said part being a hollow metal body adapted selectively to heat and cool plastic material passing therethrough, the body having spaced lands encircling the body on the exterior surface thereof, said lands being spaced apart by grooves therebetween, the walls of the grooves lying substantially radial of the body and being of substantial height, the roots of the grooves being generally semi-circular in section, an elongated high temperature radiant electric resistance heating element for heating the body, said element having an electrically insulated cylindrical sheath, the sheath of the element having a diameter somewhat less than the width of the groove, the lands having heights measured from their roots at least as great as the height of the section of the heating element measured radially of the tubular body, the element encircling the body and lying within each groove with the sheath on the element lying with its inner surface closely adjacent to the root of the groove, the sheath contacting the walls and root of the groove at random points along the length of the element, the sheath being spaced from the walls and root of the groove throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, substantially the same surfaces of the body which receive the radiant heat rays through space from the heating element and all that surface of the heating element which is spaced from the body being directly contacted by the cooling fluid.

11. Apparatus comprising a part for a plastic material extruding machine, said part being a hollow metal body adapted selectively to heat and cool plastic material passing therethrough, the body having spaced lands encircling the body on the exterior surface thereof, said lands being spaced apart by grooves therebetween, the walls of the grooves lying substantially radial of the body and being of substantial height, the roots of the grooves being generally semi-circular in section, an elongated high temperature radiant electric resistance heating element for heating the body, said element having an electrically insulated cylindrical sheath, the sheath of the element having a diameter somewhat less than the width of the groove, the lands having heights measured from their roots substantially exceeding the diameter of the heating element so that the outer surface of the heating element is located a substantial distance radially inwardly of the outer surfaces of the lands, the element encircling the body and lying within each groove with the sheath on the element lying with its inner surface closely adjacent to the root of the groove, the sheath contacting the walls and root of the groove at random points along the length of the element, the sheath being spaced from the walls and root of the groove throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, substantially the same surfaces of the body which receive the radiant heat rays through space from the heating element and all that surface of the heating element which is spaced from the body being directly contacted by the cooling fluid.

12. Apparatus comprising a part for a plastic material extruding machine, said part being a hollow metal body adapted selectively to heat and cool plastic material passing therethrough, the body having spaced helical lands encircling the body on the exterior surface thereof, said lands being spaced apart by helical grooves therebetween, the walls of the grooves lying substantially radial of the body and being of substantial height, the roots of the grooves being generally semi-circular in section, elongated high temperature radiant electric resistance heating elements for heating the body, each of said elements having an electrically insulated sheath, the sheath of the element having a diameter somewhat less than the width of the groove, each element encircling the body and lying within at least one turn of the helical groove, the sheath on the element lying with its inner surface closely adjacent to the root of the groove, the sheath contacting the walls and root of the groove at random points along the length of the element, the sheath being spaced from the walls and root of the groove throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, substantially the same surfaces of the body which receive the radiant heat rays through space from the heating element being directly contacted by the cooling fluid.

13. Apparatus comprising a part for a plastic material extruding machine, said part being a hollow metal body adapted selectively to heat and cool plastic material passing therethrough, the body having spaced helical lands encircling the body on the exterior surface thereof, said lands being spaced apart by helical grooves therebetween, the walls of the grooves lying substantially radial of the body and being of substantial height, the roots of the grooves being generally semi-circular in section, elongated high temperature radiant electric resistance heating elements for heating the body, each of said elements having an electrically insulated sheath, the sheath of the element having a diameter somewhat less than the width of the groove, the lands having heights measured from their roots at least as great as the height of the section of the heating element measured radially of the tubular body, each element encircling the body and lying within at least one turn of the helical groove, the sheath on the element lying with its inner surface closely adjacent to the root of the groove, the sheath contacting the walls and root of the groove at random points along the length of the element, the sheath being spaced from the walls and root of the groove throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, substantially the same surfaces of the body which receive the radiant heat rays through space from the heating element and all that surface of the heating element which is spaced from the body being directly contacted by the cooling fluid.

14. Apparatus comprising a part for a plastic material extruding machine, said part being a hollow metal body adapted selectively to heat and cool plastic material passing therethrough, the body having spaced helical lands encircling the body on the exterior surface thereof, said lands being spaced apart by helical grooves therebetween, the walls of the grooves lying substantially radial of the body and being of substantial height, the roots of the grooves being generally semi-circular in section, elongated high temperature radiant electric resistance heating elements for heating the body, each of said elements having an electrically insulated sheath, the sheath of the element having a diameter somewhat less than the width of the groove, the lands having heights measured from their roots substantially exceeding the diameter of the heating element so that the outer surface of the heating element is located substantially radially inwardly of the outer surfaces of the lands, each element encircling the body and lying within at least one turn of the helical groove, the sheath on the element lying with its inner surface closely adjacent to the root of the groove, the sheath contacting the walls and root of the groove at random points along the length of the element, the sheath being spaced from the walls and root of the groove throughout the remainder of the element, such remainder of the element constituting by far the predominant part of its length, a heat insulating barrier member spaced from the outer surface of the sheath of the heating element and forming with the body a substantially closed space enclosing the element, and means to pass a cooling fluid through said space, substantially the same surfaces of the body which receive the radiant heat rays through space from the heating element and all that surface of the heating element which is spaced from the body being directly contacted by the cooling fluid.

15. Apparatus comprising a body to be selectively heated and cooled, the body having spaced lands on a surface thereof, said lands being spaced apart by grooves therebetween, an elongated high temperature radiant electric resistance heating element for heating the body, said element having an electrically insulated cylindrical sheath, the sheath of the element having a diameter somewhat less than the width of the groove, the element lying within the grooves with the sheath on the element lying with a first portion of the surface of the element closely adjacent to the root of the groove but spaced from such root throughout by far the predominant part of the length of the element, a heat insulating barrier member spaced from a second portion of the surface of the sheath of the heating element remote from the first portion thereof and forming with the body a substantially closed space enclosing the element, and means to pass a cooling fluid through said space and over substantially the entire surface of the body including the lands and the sidewalls and roots of the grooves therein and substantially the entire surface of the heating element within the said space.

16. Apparatus comprising a body to be selectively heated and cooled, the body having spaced lands on the exterior surface thereof, said lands being spaced apart by grooves therebetween, an elongated high temperature radiant electric resistance heating element for heating the body, said element having an electrically insulated cylindrical sheath, the sheath of the element having a diameter somewhat less than the width of the groove, the element lying within the grooves with the sheath on the element lying with its inner surface closely adjacent to the root of the groove but spaced from such root throughout by far the predominant part of the length of the element, a heat insulating barrier member spaced from the outer surface of the sheath of the heating element and forming with the body a substantially closed space enclosing the element, and means to pass a cooling fluid through said space and over substantially the entire surface of the body including the lands and the sidewalls and roots of the grooves therein and substantially the entire surface of the heating element within said space.

References Cited in the file of this patent

UNITED STATES PATENTS

| | | |
|---|---|---|
| 1,354,588 | Thatcher et al. | Oct. 5, 1920 |
| 1,484,517 | Macy | Feb. 19, 1924 |
| 1,760,065 | Hynes | May 27, 1930 |
| 1,801,099 | McCormick | Apr. 14, 1931 |
| 2,319,482 | Tucker | May 18, 1943 |
| 2,508,988 | Bradley | May 23, 1950 |
| 2,522,365 | Greene | Sept. 12, 1950 |
| 2,541,201 | Buecken et al. | Feb. 13, 1951 |